United States Patent
Wei

(10) Patent No.: US 11,949,986 B2
(45) Date of Patent: Apr. 2, 2024

(54) ANTI-SHAKE METHOD, ANTI-SHAKE APPARATUS, AND ELECTRONIC DEVICE

(71) Applicant: VIVO MOBILE COMMUNICATION CO., LTD., Guangdong (CN)

(72) Inventor: Ziyun Wei, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

(21) Appl. No.: 17/992,765

(22) Filed: Nov. 22, 2022

(65) Prior Publication Data
US 2023/0086416 A1 Mar. 23, 2023

Related U.S. Application Data

(63) Continuation of application No. PCT/CN2021/095886, filed on May 25, 2021.

(30) Foreign Application Priority Data

May 27, 2020 (CN) .......................... 202010463762.0

(51) Int. Cl.
H04N 23/68 (2023.01)

(52) U.S. Cl.
CPC ......... H04N 23/682 (2023.01); H04N 23/683 (2023.01)

(58) Field of Classification Search
None
See application file for complete search history.

(56) References Cited

U.S. PATENT DOCUMENTS

| | | | |
|---|---|---|---|
| 9,584,728 B2* | 2/2017 | Baek | H04N 23/63 |
| 9,912,868 B2* | 3/2018 | Wakamatsu | H04N 23/62 |
| 2014/0300765 A1* | 10/2014 | Takao | H04N 23/6842 |
| | | | 348/208.1 |
| 2019/0045124 A1* | 2/2019 | Hashizume | H04N 23/54 |

FOREIGN PATENT DOCUMENTS

| | | |
|---|---|---|
| CN | 104170370 A | 11/2014 |
| CN | 105340267 A | 2/2016 |
| CN | 110072070 A | 7/2019 |

(Continued)

OTHER PUBLICATIONS

International Patent Application No. PCT/CN2021/095886, International Search Report and Written Opinion with Partial English Machine Translation dated Aug. 23, 2021, 11 pages.

*Primary Examiner* — James M Hannett
(74) *Attorney, Agent, or Firm* — Fredrikson & Byron, P.A.

(57) ABSTRACT

The present application discloses an anti-shake method, an anti-shake apparatus, and an electronic device. The method includes: acquiring, in a case that a camera of an electronic device captures a first picture in real time, a shaking parameter of the electronic device; and cropping a first region in the first picture according to a first cropping parameter corresponding to the shaking parameter, and displaying the cropped first picture, where the first picture includes the first region and a second region, the second region is a common region of the first picture and N frames of pictures, the N frames of pictures are pictures captured before the first picture is captured, and N is an integer greater than or equal to 1.

12 Claims, 4 Drawing Sheets

(56) References Cited

FOREIGN PATENT DOCUMENTS

| CN | 110166697 A | 8/2019 |
| CN | 110213479 A | 9/2019 |
| CN | 110213490 A | 9/2019 |
| CN | 110278360 A | 9/2019 |
| CN | 110771144 A | 2/2020 |
| CN | 111193866 A | 5/2020 |
| JP | 2012044418 A | 3/2012 |

* cited by examiner

ANTI-SHAKE METHOD, ANTI-SHAKE APPARATUS, AND ELECTRONIC DEVICE

CROSS-REFERENCE TO RELATED APPLICATIONS

This application is a continuation of International Application No. PCT/CN2021/095886, filed on May 25, 2021, which claims priority to Chinese Patent Application No. 202010463762.0, entitled "ANTI-SHAKE METHOD, ANTI-SHAKE APPARATUS, AND ELECTRONIC DEVICE", and filed with the National Intellectual Property Administration, PRC on May 27, 2020, which is incorporated herein by reference in its entirety.

TECHNICAL FIELD

The present disclosure relates to the field of communication device technologies, and in particular, to an anti-shake method, an anti-shake apparatus, and an electronic device.

BACKGROUND

With the development of an electronic device, users use a shooting function of the electronic device more and more frequently, and have higher requirements for the stability of shooting pictures of the electronic device.

At present, to avoid the problem that the shot picture is blurred due to the shake of the electronic device, an electronic anti-shake manner is usually used for achieving an anti-shake effect. Specifically, in the process of capturing an image, the electronic device crops the captured image according to a fixed cropping parameter to achieve the anti-shake effect.

However, according to the foregoing anti-shake manner, the electronic device can only crop the image according to the fixed cropping parameter, which makes the flexibility of anti-shake of the electronic device poor.

SUMMARY

According to a first aspect of the present application, an anti-shake method is provided, which includes: acquiring, in a case that a camera of an electronic device captures a first picture in real time, a shaking parameter of the electronic device; and cropping a first region in the first picture according to a first cropping parameter corresponding to the shaking parameter, and displaying the cropped first picture. The first picture includes the first region and a second region, the second region is a common region of the first picture and N frames of pictures, the N frames of pictures are pictures captured before the first picture is captured, and N is an integer greater than or equal to 1.

According to a second aspect of the present application, an anti-shake apparatus is provided, which includes: an acquisition module, a cropping module, and a display module, where the acquisition module is configured to acquire, in a case that a camera of an electronic device captures a first picture in real time, a shaking parameter of the electronic device; the cropping module is configured to crop a first region in the first picture according to a first cropping parameter corresponding to the shaking parameter determined by the acquisition module; and the display module is configured to display the first picture cropped by the cropping module. The first picture includes the first region and a second region, the second region is a common region of the first picture and N frames of pictures, the N frames of pictures are pictures captured before the first picture is captured, and N is an integer greater than or equal to 1.

According to a third aspect of the present application, an electronic device is provided, which includes a processor, a memory, and a program or an instruction stored on the memory and executable on the processor. The program or the instruction, when executed by the processor, implements steps of the method according to the first aspect.

According to a fourth aspect of the present application, a readable storage medium storing a program or an instruction is provided. The program or the instruction, when executed by a processor, implements steps of the method according to the first aspect.

According to a fifth aspect of the present application, a chip is provided, which includes a processor and a communication interface. The communication interface is coupled to the processor, and the processor is configured to run a program or an instruction to implement the method according to the first aspect.

DETAILED DESCRIPTION

The following clearly describes the technical solutions in the embodiments of the present application with reference to the accompanying drawings in the embodiments of the present application. Apparently, the described embodiments are some embodiments of the present application rather than all of the embodiments. All other embodiments obtained by a person of ordinary skill in the art based on the embodiments of the present application without creative efforts shall fall within the protection scope of the present application.

In the specification and claims of the present application, the terms "first", "second" and the like are used to distinguish similar objects, but are not used to describe a specific order or sequence. It is to be understood that such used data is interchangeable in a proper circumstance, so that the embodiments of the present application may be implemented in an order other than the order illustrated or described herein. In addition, "and/or" in this specification and the claims represents at least one of the connected objects, and the character "/" generally indicates an "or" relationship between the associated objects.

An anti-shake method provided in the embodiments of the present application is described in detail below with reference to the accompanying drawings by using specific embodiments and application scenarios.

Figure 1:
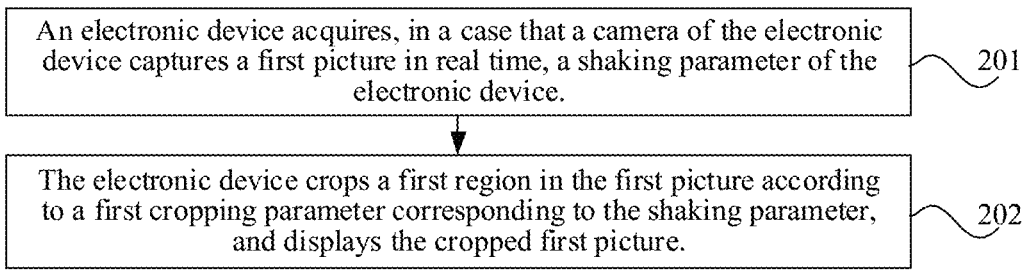
FIG. 1 is a schematic flowchart of an anti-shake method according to an embodiment of the present application.

FIG. 1 is a schematic flowchart of an anti-shake method according to an embodiment of the present application, including step 201 and step 202:

Step 201: An electronic device acquires, in a case that a camera of the electronic device captures a first picture in real time, a shaking parameter of the electronic device.

The shaking parameter is configured to indicate a shaking degree of the electronic device.

In this embodiment of the present application, the camera may be a main camera, a wide-angle camera, or a telephoto camera, which is not limited in this embodiment of the present application.

In this embodiment of the present application, the first picture may be a picture captured by a front camera of the electronic device, a picture captured by a rear camera of the electronic device, or a picture captured by an externally connected camera of the electronic device, which is not limited in this embodiment of the present application.

In this embodiment of the present application, the first picture may include a target object, and the target object may include at least one of the following: a character or scenery.

In this embodiment of the present application, there may be a positive correlation or a negative correlation between the shaking parameter and the shaking degree of the electronic device, which is not limited in this embodiment of the present application.

Optionally, in this embodiment of the present application, the shaking parameter includes at least one of the following: a rotation angle of the electronic device, a rotational angular velocity of the electronic device, a rotation direction of the electronic device, a moving speed of the electronic device, a moving acceleration of the electronic device, or a moving direction of the electronic device.

Exemplarily, the rotation angle of the electronic device may be any angle. The rotational angular velocity of the electronic device may be any angular velocity. The rotation direction of the electronic device may be any direction.

It should be noted that, the shaking parameter includes but is not limited to the foregoing six parameters. For example, the shaking parameter may further be a rotational arc length of the electronic device calculated by the electronic device through the rotational angular velocity, or displacement obtained by the electronic device according to the moving speed.

In an example, in a case that the shaking parameter is the rotation angle, there may be a positive correlation between the rotation angle and the shaking degree of the electronic device. That is, when the rotation angle is larger, the shaking degree of the electronic device is greater; and when the rotation angle is smaller, the shaking degree of the electronic device is slighter.

It should be noted that, the rotation angle of the electronic device, the rotational angular velocity of the electronic device, and the rotation direction of the electronic device may be obtained through a gyroscope.

Step 202: The electronic device crops a first region in the first picture according to a first cropping parameter corresponding to the shaking parameter, and displays the cropped first picture.

The first picture includes the first region and a second region. The second region is a common region of the first picture and N frames of pictures. The N frames of pictures are pictures captured before the first picture is captured. N is an integer greater than or equal to 1.

It may be understood that the first region is another region in the first picture except the second region.

In this embodiment of the present application, the cropping parameter in this embodiment of the present application may be a cropping percentage or a cropping size (such as a cropping length and width), which is not limited in this embodiment of the present application.

In an example, the first cropping parameter is the cropping percentage. The cropping percentage may be a percentage between a region where the first picture is cropped and the whole first picture, or a percentage between the cropped first picture and the whole first picture, which is not limited in this embodiment of the present application.

In another example, the first cropping parameter is the cropping size. The cropping size may be a size of a region where the first picture is cropped, or may be a size of the cropped first picture, which is not limited in this embodiment of the present application.

Exemplarily, after the electronic device determines the shaking parameter, the first cropping parameter may be determined according to a correspondence between the shaking parameter and the cropping parameter.

The correspondence between the shaking parameter and the cropping parameter may be set by default by a system, or may be preset by a user, which is not limited in this embodiment of the present application.

In an example, in a case that the shaking parameter is the rotation angle of the electronic device, an interval value of the rotation angle of the electronic device may correspond to a cropping parameter. For example, the interval value of the rotation angle of the electronic device ranges from 1 degree to 10 degrees, and the corresponding cropping parameter may be 20%. The interval value of the rotation angle of the electronic device ranges from 11 degrees to 20 degrees, and the corresponding cropping parameter may be 25%.

Exemplarily, the electronic device may compare the first picture with N frames of pictures captured by the electronic device before the first picture is captured, to acquire the common region of the first picture and the previous picture.

Exemplarily, the picture before the first picture may be at least one frame of picture captured before the electronic device captures the first picture. For example, the picture before the first picture may be 1 frame of picture captured before the electronic device captures the first picture, or may be 5 frames of pictures captured before the electronic device captures the first picture.

Exemplarily, that the electronic device crops the first region in the first picture may include: the electronic device crops all or part of the first region.

It should be noted that, in a case that the second region in the first picture may be cropped when the electronic device crops the first picture according to the first cropping parameter, the electronic device may crop the second region.

It should be noted that, in practical application, the electronic device may not perform any processing on a first frame of picture captured by the electronic device, or may crop the first frame of picture according to a default cropping parameter, which is not limited in this embodiment of the present application.

Figure 2:
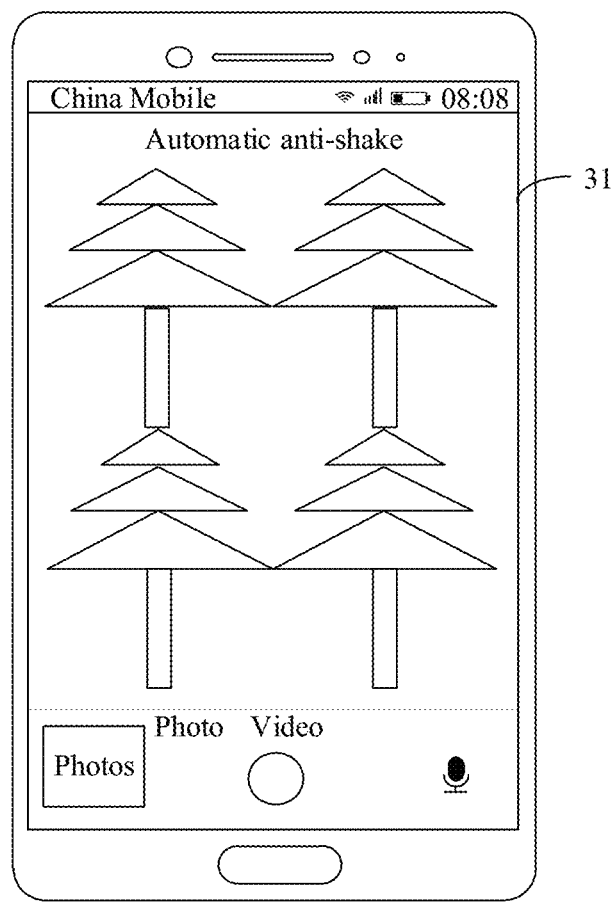
FIG. 2 is a schematic diagram 1 of an interface to which an anti-shake method according to an embodiment of the present application is applied.
Figure 3:
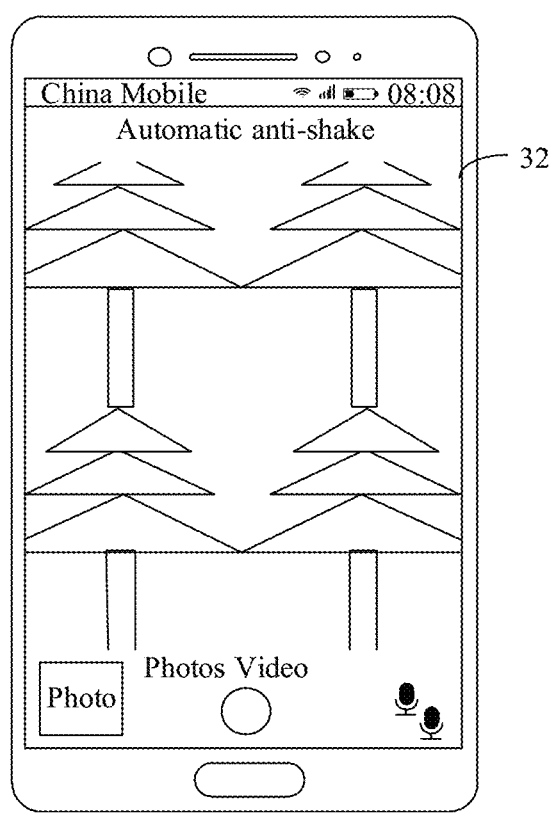
FIG. 3 is a schematic diagram 2 of an interface to which an anti-shake method according to an embodiment of the present application is applied.

For example, in a case that a user uses the electronic device to shoot videos, when the electronic device captures the first frame of picture, the electronic device may crop the first frame of picture by using the default cropping parameter of 20% and display the cropped picture. Then, when the user continues to use the electronic device to shoot and capture a second frame of picture (that is, the first picture), if the electronic device determines that the electronic device rotates by 10 degrees (that is, a slight shaking of the electronic device is detected), the electronic device may determine according to the shaking parameter that the cropping parameter is 20%. Next, the electronic device may crop the second frame of picture according to the cropping parameter of 20% and the first frame of picture. In this case, as shown in FIG. 2, the electronic device may display a cropped second frame of picture 31. Then, when the user continues to use the electronic device to shoot and capture a third frame of picture (that is, the first picture), if the electronic device determines that the electronic device rotates by 30 degrees (that is, a violent shaking of the electronic device is detected), the electronic device may determine according to the shaking parameter that the cropping parameter is 30%. Next, the electronic device may crop the third frame of picture according to the cropping parameter of 30% and the second frame of picture. In this case, as shown in FIG. 3, the electronic device may display a cropped third frame of picture 32.

In the anti-shake method provided in this embodiment of the present application, first, an electronic device may acquire, in a case that a camera of the electronic device captures a first picture in real time, a shaking parameter of the electronic device. Then, the electronic device may crop a first region in the first picture according to a first cropping parameter corresponding to the shaking parameter, and display the cropped first picture. The first picture includes the first region and a second region. The second region is a common region of the first picture and N frames of pictures. The N frames of pictures are pictures captured before the first picture is captured. Compared with the conventional solutions of cropping a picture by using a fixed cropping parameter, through the foregoing solution, the electronic device may flexibly acquire different cropping parameters according to an anti-shake degree of the electronic device, and then crop the region in the first picture except the common region according to the different cropping parameters, thereby achieving the objective of anti-shake of the electronic device, and improving the flexibility of the anti-shake of the electronic device.

Optionally, in this embodiment of the present application, when the cropping parameter is excessively large, a visible range of the cropped picture may be affected, and a shooting requirement cannot be met. Therefore, the electronic device may crop the picture according to a preset cropping parameter to ensure the visible range of the picture.

Exemplarily, the cropping a first region in the first picture according to a first cropping parameter corresponding to the shaking parameter in step 202 may include the following step 202*a*:

Step 202*a*: The electronic device crops, in a case that the first cropping parameter is greater than a first preset cropping parameter, the first region in the first picture according to the first preset cropping parameter.

Exemplarily, the first preset cropping parameter may be configured by a system by default, or may be preset by the user, which is not limited in this embodiment of the present application.

Exemplarily, the first preset cropping parameter may be referred to as a maximum cropping parameter.

It should be noted that, for different cameras, the first preset cropping parameter may be the same or different, which is not limited in this embodiment of the present application.

For example, in a case that the camera is the telephoto camera, the first preset cropping parameter may be 25%. In a case that the camera is the main camera, the first preset cropping parameter may be 40%. In a case that the camera is the wide-angle camera, the first preset cropping parameter may be 50%.

It should be noted that, when the cropping parameter is excessively large, the effective picture contents in the cropped picture are excessively few, thereby affecting a visual range of the picture.

The anti-shake method provided in the present application may be applied to a scene in which the visual range of the picture is ensured. The electronic device may set the first preset cropping parameter. The first picture cropped according to the first preset cropping parameter may be in a normal visual range. Therefore, when the first cropping parameter is greater than the first preset cropping parameter, the electronic device may crop the first picture according to the first preset cropping parameter, to ensure the visual range of the picture.

Optionally, in this embodiment of the present application, in a case that the electronic device has at least two cameras, the electronic device may replace a picture of another camera with a picture captured by one camera, to ensure the visual range of the picture and further improve an anti-shake effect of the electronic device.

Exemplarily, in a case that the electronic device includes a first camera and a second camera, the cropping a first region in the first picture according to a first cropping parameter corresponding to the shaking parameter in step 202 may include the following step 202*b*:

Step 202*b*: The electronic device crops, in a case that the electronic device displays the picture captured by the second camera, and a second cropping parameter is greater than a second preset cropping parameter, the first region in the first picture according to the first cropping parameter.

The first camera and the second camera are configured to capture an image of a same object. A field angle corresponding to the first picture captured by the first camera is greater than a field angle corresponding to a second picture captured by the second camera. The second cropping parameter is a cropping parameter corresponding to the second camera determined according to the shaking parameter, and the first cropping parameter is a cropping parameter corresponding to the first camera.

It may be understood that the field angle corresponding to the first picture captured by the first camera is greater than the field angle corresponding to the second picture captured by the second camera. That is, the picture content of the first picture is more than the picture content of the second picture.

Exemplarily, when the second camera is the telephoto camera, the first camera may be the main camera or the wide-angle camera. When the second camera is the main camera, the first camera may be the wide-angle camera, which may be set according to an actual need, and is not limited in this embodiment of the present application.

Exemplarily, that the first cropping parameter is a cropping parameter corresponding to the first camera may include: the first cropping parameter is a cropping parameter corresponding to the first camera and determined according to the second cropping parameter, or the first cropping parameter is a cropping parameter corresponding to the first camera and determined according to the shaking parameter.

It should be noted that, the first cropping parameter determined according to the second cropping parameter may be the same as or different from the first cropping parameter determined according to the shaking parameter, which is not limited in this embodiment of the present application.

In an example, a preset cropping parameter corresponding to the first camera may be different from a preset cropping parameter (that is, the second preset cropping parameter) corresponding to the second camera.

For example, the electronic device has the main camera and the wide-angle camera, and may use the main camera and the wide-angle camera to capture pictures at the same time. When a screen of the electronic device displays a video picture shot by the main camera, if the electronic device shakes violently when the main camera of the electronic device captures a certain picture, the electronic device may determine that the rotation angle of the electronic device is 40 degrees, and determine that a second cropping percentage is 45% according to the rotation angle. In this case, the determined second cropping percentage of 45% is greater than the second preset cropping parameter of 40%, which causes the certain picture captured by the main camera to be excessive cropped to thereby affect the visibility of the picture. Therefore, the electronic device may determine the first cropping parameter corresponding to the wide-angle camera to be 50% according to the determined second cropping percentage of 45% corresponding to the main camera. Then, the electronic device may crop the first picture captured by the wide-angle camera according to the first cropping parameter of 50%. Finally, the electronic device may display the cropped first picture captured by the wide-angle camera.

It should be noted that, because the wide-angle camera shoots more picture contents than the main camera, more picture contents may be retained in the wide-angle camera in a case of using the same cropping percentage as the main camera or even using a larger cropping percentage than the cropping percentage corresponding to the main camera. Therefore, the electronic device may crop the picture captured by the wide-angle camera through a larger cropping percentage to obtain a picture with similar picture content to that of the picture captured by the main camera, so as to achieve a smooth switching effect, ensure the visual range of the picture, and further improve the anti-shake effect.

It should be noted that, the second preset cropping parameter and the first preset cropping parameter may be the same parameter or different parameters, which is not limited in this embodiment of the present application.

The anti-shake method provided in the present application may be applied to a scene where a plurality of cameras are used for improving the anti-shake effect. The electronic device may crop a picture taken by a camera with more picture contents to replace a picture taken by a camera with less picture contents, so as to ensure the visual range of the picture and further improve the anti-shake effect.

Optionally, in this embodiment of the present application, the cropping parameter may be preset by the user.

Exemplarily, before step 201, the method may further include the following step A1 and step A2:

Step A1: The electronic device receives a first input by the user.

Exemplarily, the first input may include: a click input on the screen by the user, a voice instruction input by the user, or a specific gesture input by the user, which may be determined according to an actual use requirement, and is not limited in this embodiment of the present application.

The specific gesture in this embodiment of the present application may be any one of a single click gesture, a slide gesture, a drag gesture, a pressure recognition gesture, a long press gesture, an area change gesture, a double press gesture, and a double click gesture. The click input in this embodiment of the present application may be a single click input, a double click input, or a click input of any number of times, or may be a long press input or a short press input.

Step A2: The electronic device displays a cropping parameter setting interface in response to the first input.

The cropping parameter setting interface includes at least one parameter setting box, and each parameter setting box is configured to set a cropping parameter.

Figure 4:
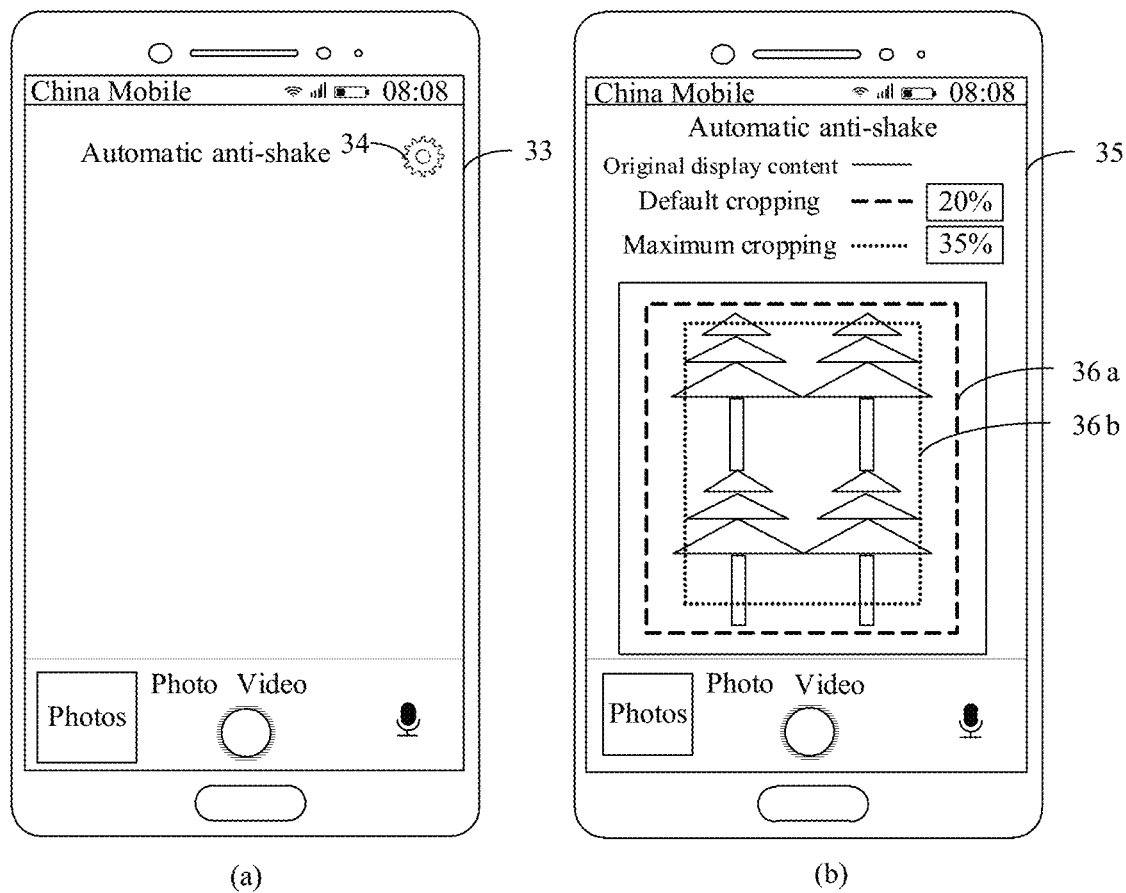
FIG. 4 is a schematic diagram 3 of an interface to which an anti-shake method according to an embodiment of the present application is applied.

For example, as shown in (a) in FIG. 4, in a case that the electronic device displays a preview interface 33 of the main camera, when the user needs to set a default cropping parameter and a maximum cropping parameter of the main camera, a "set" button 34 may be long pressed. In this case, as shown in (b) in FIG. 4, the electronic device displays a cropping parameter setting interface 35. Two parameter setting boxes are displayed on the cropping parameter setting interface 35, namely the default cropping parameter setting box and the maximum cropping parameter setting box. A sample image is further displayed on the cropping parameter setting interface 35, and the sample image is surrounded by a black frame which indicates an original display content of the sample image. When the user enters 20% in the default cropping parameter setting box, the electronic device displays a dotted line box 36a to remind the user of an estimated display picture content with 20% of the picture cropped. When the user enters 35% in the maximum cropping parameter setting box, the electronic device displays a dotted line box 36b to remind the user of an estimated display picture content with 35% of the picture cropped. In this way, the user may set the cropping parameter according to the need.

Exemplarily, in a case that the electronic device has at least two cameras, the cropping parameter setting interface may include at least two regions, where different regions are used to set the cropping parameters of different cameras.

The anti-shake method provided in the present application may be applied to a scene of setting the cropping parameter. The user can trigger the electronic device to display the cropping parameter setting interface. Then, the user can input the cropping parameter in the cropping parameter setting box displayed in the cropping parameter setting interface according to the need. In this way, the setting of the cropping parameter is more flexible.

It should be noted that, for the anti-shake method provided in the embodiments of the present application, an execution entity may be an anti-shake apparatus or a control module in the anti-shake apparatus that is configured to execute and load the anti-shake method. In the embodiments of the present application, the anti-shake apparatus provided in the embodiments of the present application is provided by using an example in which the anti-shake apparatus performs and loads the anti-shake method.

Figure 5:
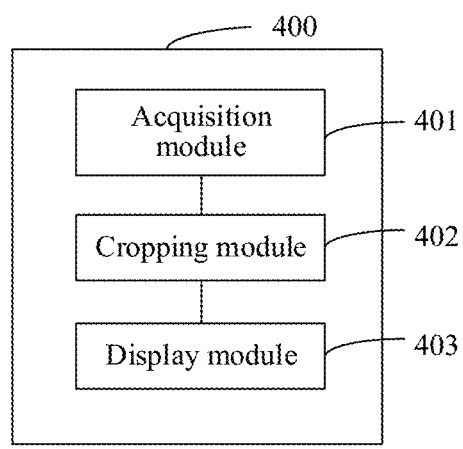
FIG. 5 is a schematic structural diagram of an anti-shake apparatus according to an embodiment of the present application.

FIG. 5 is a possible schematic structural diagram of an anti-shake apparatus according to an embodiment of the present application. As shown in FIG. 5, the anti-shake apparatus 400 includes: an acquisition module 401, a cropping module 402, and a display module 403, where the acquisition module 401 is configured to acquire, in a case that a camera of an electronic device captures a first picture in real time, a shaking parameter of the electronic device; the cropping module 402 is configured to crop a first region in the first picture according to a first cropping parameter corresponding to the shaking parameter determined by the acquisition module 401; and the display module 403 is configured to display the first picture cropped by the cropping module 402. The first picture includes the first region and a second region, the second region is a common region of the first picture and N frames of pictures, the N frames of pictures are pictures captured before the first picture is captured, and N is an integer greater than or equal to 1.

Optionally, the shaking parameter may include at least one of the following: a rotation angle of the electronic device, a rotational angular velocity of the electronic device, a rotation direction of the electronic device, a moving speed of the electronic device, a moving acceleration of the electronic device, or a moving direction of the electronic device.

Optionally, the cropping module 402 is further configured to crop, in a case that the first cropping parameter is greater than a first preset cropping parameter, the first region in the first picture according to the first preset cropping parameter.

Optionally, in a case that the electronic device includes a first camera and a second camera, the first camera and the second camera are configured to capture an image of a same object, and a field angle corresponding to the first picture captured by the first camera is greater than a field angle corresponding to a second picture captured by the second camera, the cropping module 402 is further configured to crop, in a case that the electronic device displays the picture captured by the second camera, and a second cropping parameter is greater than a second preset cropping parameter, the first region in the first picture according to the first cropping parameter. The second cropping parameter is a cropping parameter corresponding to the second camera determined according to the shaking parameter, and the first cropping parameter is a cropping parameter corresponding to the first camera.

Optionally, a preset cropping parameter corresponding to the first camera is different from a preset cropping parameter corresponding to the second camera.

The anti-shake apparatus in this embodiment of the present application may be an apparatus, or may be a component, an integrated circuit, or a chip in a terminal. The apparatus may be a mobile electronic device, or may be a non-mobile electronic device. Exemplarily, the mobile electronic device may be a mobile phone, a tablet computer, a notebook computer, a palm computer, an in-vehicle electronic device, a wearable device, an ultra-mobile personal computer (UMPC), a netbook, or a personal digital assistant (PDA). The non-mobile electronic device may be a server, a network attached storage (NAS), a personal computer (PC), a television (TV), a teller machine, a teller machine, or a self-service machine, which are not specifically limited in this embodiment of the present application.

The anti-shake apparatus in this embodiment of the present application may be an apparatus with an operating system. The operating system may be an Android (Android) operating system, may be an ios operating system, or may be another possible operating system, which is not specifically limited in this embodiment of the present application.

The anti-shake apparatus provided in this embodiment of the present application can implement processes implemented by the electronic device in the method embodiments shown in FIG. 1 to FIG. 4. To avoid repetition, details are not described herein again.

In the anti-shake apparatus provided in this embodiment of the present application, first, the anti-shake apparatus may acquire, in a case that a camera of the electronic device captures a first picture in real time, a shaking parameter of the electronic device. Then, the anti-shake apparatus may crop a first region in the first picture according to a first cropping parameter corresponding to the shaking parameter, and display the cropped first picture. The first picture includes the first region and a second region. The second region is a common region of the first picture and N frames of pictures. The N frames of pictures are pictures captured before the first picture is captured. Compared with the conventional solutions of cropping the picture by using a fixed cropping parameter, through the foregoing solution, the anti-shake apparatus may flexibly acquire different cropping parameters according to the anti-shake degree of the electronic device, and then crop the region in the first picture except the common region according to the different cropping parameters, thereby achieving the objective of anti-shake of the electronic device, and improving the flexibility of the anti-shake of the electronic device.

Optionally, an embodiment of the present application further provides an electronic device, including a processor 110, a memory 109, and a program or an instruction stored on the memory 109 and executable on the processor 110. The program or the instruction, when executed by the processor 110, implements processes of the foregoing anti-shake method embodiments. The same technical effect may be achieved. To avoid repetition, details are not described herein again.

It should be noted that, the electronic device in this embodiment of the present application includes the foregoing mobile electronic device and non-mobile electronic device.

Figure 6:
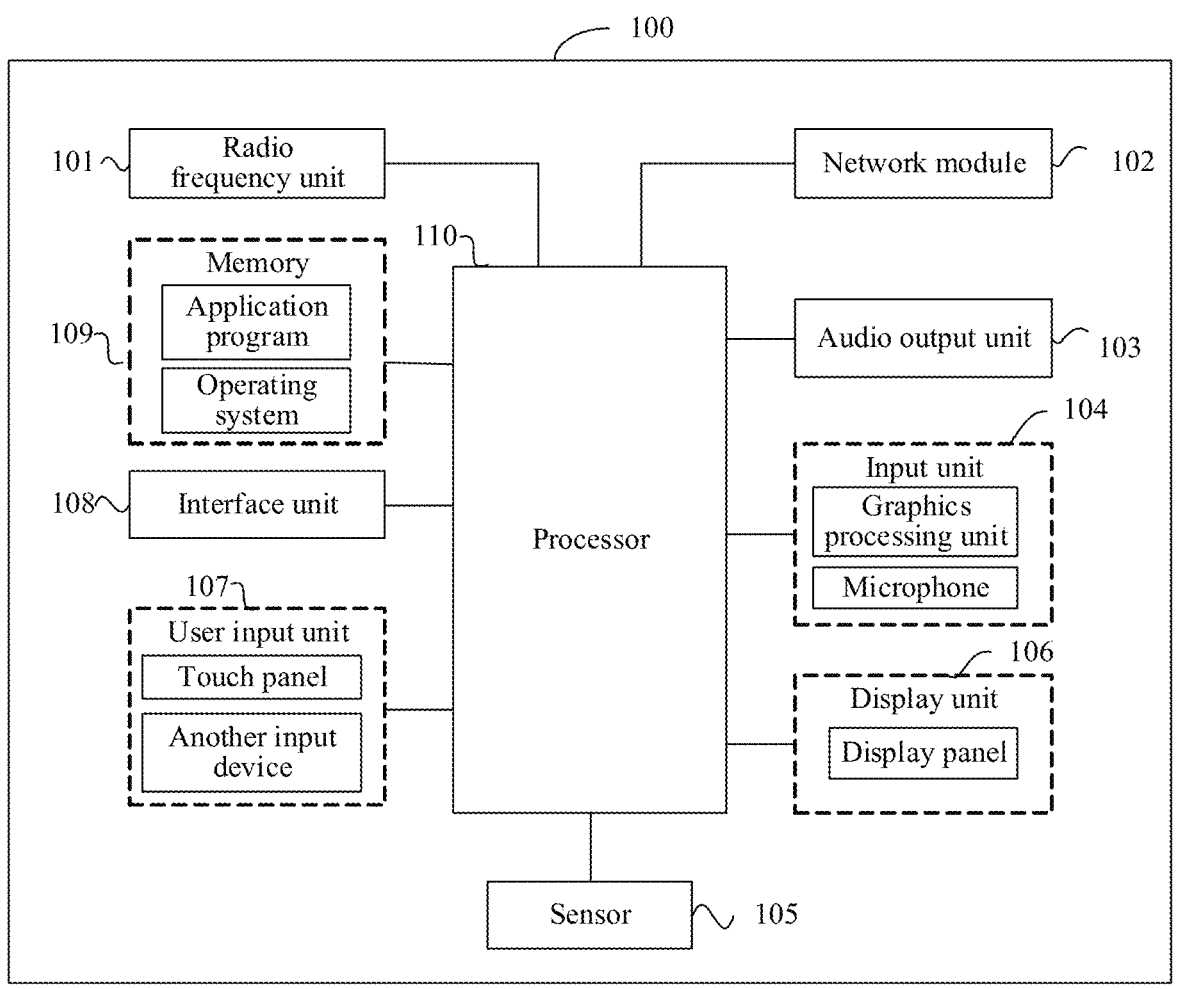
FIG. 6 is a schematic structural diagram of an electronic device according to an embodiment of the present application.

FIG. 6 is a schematic diagram of a hardware structure of an electronic device according to an embodiment of the present application.

The electronic device 100 includes but is not limited to: components such as a radio frequency unit 101, a network module 102, an audio output unit 103, an input unit 104, a sensor 105, a display unit 106, a user input unit 107, an interface unit 108, a memory 109, a processor 110, and the like. The input unit 104 may include a graphics processing unit and a microphone. The display unit 106 may include a display panel. The user input unit 107 may include a touch panel and another input device. The memory 109 may include an application program and an operating system.

A person skilled in the art may understand that the electronic device 100 may further include a power supply (such as a battery) for supplying power to the components. The power supply may be logically connected to the processor 110 through a power supply management system, thereby implementing functions such as charging, discharging, and power consumption management through the power supply management system. The structure of the electronic device shown in FIG. 6 constitutes no limitation on the electronic device, and the electronic device may include more or fewer components than those shown in the figure, or some components may be combined, or a different component deployment may be used. Details are not described herein again.

The processor 110 is configured to acquire, in a case that a camera of an electronic device captures a first picture in real time, a shaking parameter of the electronic device, and crop a first region in the first picture according to a first cropping parameter corresponding to the shaking parameter. The display unit 106 is configured to display the first picture cropped by the processor 110. The first picture includes the first region and a second region, the second region is a common region of the first picture and N frames of pictures, the N frames of pictures are pictures captured before the first picture is captured, and N is an integer greater than or equal to 1.

Optionally, the shaking parameter may include at least one of the following: a rotation angle of the electronic device, a rotational angular velocity of the electronic device, a rotation direction of the electronic device, a moving speed of the electronic device, a moving acceleration of the electronic device, or a moving direction of the electronic device.

Optionally, the processor 110 is further configured to crop, in a case that the first cropping parameter is greater than a first preset cropping parameter, the first region in the first picture according to the first preset cropping parameter.

Optionally, in a case that the electronic device includes a first camera and a second camera, the first camera and the second camera are configured to capture an image of a same object, and a field angle corresponding to the first picture captured by the first camera is greater than a field angle corresponding to a second picture captured by the second camera, the processor 110 is further configured to crop, in a case that the electronic device displays the picture captured by the second camera, and a second cropping parameter is greater than a second preset cropping parameter, the first region in the first picture according to the first cropping parameter. The second cropping parameter is a cropping parameter corresponding to the second camera determined according to the shaking parameter, and the first cropping parameter is a cropping parameter corresponding to the first camera.

Optionally, a preset cropping parameter corresponding to the first camera is different from a preset cropping parameter corresponding to the second camera.

In the electronic device provided in this embodiment of the present application, first, the electronic device may acquire, in a case that a camera of the electronic device captures a first picture in real time, a shaking parameter of the electronic device. Then, the electronic device may crop a first region in the first picture according to a first cropping parameter corresponding to the shaking parameter, and display the cropped first picture. The first picture includes the first region and a second region. The second region is a common region of the first picture and N frames of pictures. The N frames of pictures are pictures captured before the first picture is captured. Compared with the conventional solutions of cropping a picture by using a fixed cropping parameter, through the foregoing solution, the electronic device may flexibly acquire different cropping parameters according to an anti-shake degree of the electronic device, and then crop the region in the first picture except the common region according to the different cropping parameters, thereby achieving the objective of anti-shake of the electronic device, and improving the flexibility of the anti-shake of the electronic device.

An embodiment of the present application further provides a readable storage medium, storing a program or an instruction. The program or the instruction, when executed by a processor, implements processes of the foregoing anti-shake method embodiments. The same technical effect may be achieved. To avoid repetition, details are not described herein again.

The processor is a processor in the electronic device described in the foregoing embodiments. The readable storage medium may include a computer-readable storage medium such as a read-only memory (ROM), a random access memory (RAM), a magnetic disk, or an optical disc.

An embodiment of the present application further provides a chip, including a processor and a communication interface. The communication interface is coupled to the processor, and the processor is configured to run a program or an instruction to implement processes of the foregoing anti-shake method embodiments. The same technical effect may be achieved. To avoid repetition, details are not described herein again.

It should be understood that, the chip mentioned in this embodiment of the present application may also be referred to as a system-level chip, a system chip, a chip system, a system on chip, or the like.

It should be noted that, the terms "include", "comprise", or any other variation thereof in this specification is intended to cover a non-exclusive inclusion. In this way, a process, method, object, or apparatus that includes a series of elements not only includes such elements, but also includes other elements not specified expressly, or further includes inherent elements of the process, method, object, or apparatus. Without more limitations, elements defined by the sentence "including a/an . . . " does not exclude other same elements existing in the process, method, object, or apparatus which includes the element. In addition, it should be pointed out that the scope of the methods and apparatuses in the implementations of the present application is not limited to performing functions in an order shown or discussed, but may further include performing functions in a basically simultaneous manner or in a converse order according to the involved functions. For example, the described methods may be performed in an order different from the described order, and various steps may be added, omitted, or combined. In addition, features described with reference to some examples may be combined in other examples.

Through the descriptions of the foregoing implementations, a person skilled in the art may clearly understand that the methods in the foregoing embodiments may be implemented through software and a necessary general hardware platform, and certainly, may also be implemented by hardware, but in many cases, the former manner is a better implementation. Based on such an understanding, the technical solutions of the present application essentially or the part contributing to the prior art may be embodied in a form of a software product. The computer software product is stored in a storage medium (such as a ROM/RAM, a magnetic disk, or an optical disc) and includes several instructions to enable a terminal (which may be a mobile phone, a computer, a server, an air conditioner, a network device, or the like) to perform the methods described in the embodiments of the present application.

The embodiments of the present application are described above with reference to the accompanying drawings. However, the present application is not limited to the foregoing specific implementations. The foregoing specific implementations are only exemplary and not limitative. Enlightened by the present application, a person of ordinary skill in the art may further make many variations without departing from the idea of the present application and the protection scope of the claims. All of the variations fall within the protection scope of the present application.

What is claimed is:

1. An anti-shake method, comprising:
acquiring, in a case that a camera of an electronic device captures a first picture in real time, a shaking parameter of the electronic device; and
cropping a first region in the first picture according to a first cropping parameter corresponding to the shaking parameter, and displaying the cropped first picture,
wherein the first picture comprises the first region and a second region, the second region is a common region of the first picture and N frames of pictures, the N frames of pictures are pictures captured before the first picture is captured, and N is an integer greater than or equal to 1; and
wherein the electronic device comprises a first camera and a second camera, the first camera and the second camera are configured to capture an image of a same object, and a field angle corresponding to the first picture captured by the first camera is greater than a field angle corresponding to a second picture captured by the second camera; and the cropping a first region in the first picture according to a first cropping parameter corresponding to the shaking parameter comprises: cropping, in a case that the electronic device displays the picture captured by the second camera, and a second cropping parameter is greater than a second preset cropping parameter, the first region in the first picture according to the first cropping parameter, wherein the second cropping parameter is a cropping parameter corresponding to the second camera determined according to the shaking parameter, and the first cropping parameter is a cropping parameter corresponding to the first camera.

2. The method according to claim 1, wherein the shaking parameter comprises at least one of the following: a rotation angle of the electronic device, a rotational angular velocity of the electronic device, a rotation direction of the electronic device, a moving speed of the electronic device, a moving acceleration of the electronic device, or a moving direction of the electronic device.

3. The method according to claim 2, wherein the cropping a first region in the first picture according to a first cropping parameter corresponding to the shaking parameter comprises:

cropping, in a case that the first cropping parameter is greater than a first preset cropping parameter, the first region in the first picture according to the first preset cropping parameter.

4. The method according to claim 1, wherein a preset cropping parameter corresponding to the first camera is different from a preset cropping parameter corresponding to the second camera.

5. An electronic device, comprising:
a processor; and
a memory storing a program or an instruction that is executable on the processor, wherein the program or the instruction, when executed by the processor, causes the electronic device to perform the following steps:
acquiring, in a case that a camera of an electronic device captures a first picture in real time, a shaking parameter of the electronic device; and
cropping a first region in the first picture according to a first cropping parameter corresponding to the shaking parameter, and displaying the cropped first picture,
wherein the first picture comprises the first region and a second region, the second region is a common region of the first picture and N frames of pictures, the N frames of pictures are pictures captured before the first picture is captured, and N is an integer greater than or equal to 1; and
wherein the electronic device comprises a first camera and a second camera, the first camera and the second camera are configured to capture an image of a same object, and a field angle corresponding to the first picture captured by the first camera is greater than a field angle corresponding to a second picture captured by the second camera; and
the cropping a first region in the first picture according to a first cropping parameter corresponding to the shaking parameter comprises: cropping, in a case that the electronic device displays the picture captured by the second camera, and a second cropping parameter is greater than a second preset cropping parameter, the first region in the first picture according to the first cropping parameter, wherein the second cropping parameter is a cropping parameter corresponding to the second camera determined according to the shaking parameter, and the first cropping parameter is a cropping parameter corresponding to the first camera.

6. The method according to claim 5, wherein the shaking parameter comprises at least one of the following: a rotation angle of the electronic device, a rotational angular velocity of the electronic device, a rotation direction of the electronic device, a moving speed of the electronic device, a moving acceleration of the electronic device, or a moving direction of the electronic device.

7. The method according to claim 6, wherein the cropping a first region in the first picture according to a first cropping parameter corresponding to the shaking parameter comprises:

cropping, in a case that the first cropping parameter is greater than a first preset cropping parameter, the first region in the first picture according to the first preset cropping parameter.

8. The method according to claim 5, wherein a preset cropping parameter corresponding to the first camera is different from a preset cropping parameter corresponding to the second camera.

9. A non-transitory readable storage medium storing a program or an instruction, wherein the program or the instruction, when executed by a processor, performs the following steps:
acquiring, in a case that a camera of an electronic device captures a first picture in real time, a shaking parameter of the electronic device; and
cropping a first region in the first picture according to a first cropping parameter corresponding to the shaking parameter, and displaying the cropped first picture,
wherein the first picture comprises the first region and a second region, the second region is a common region of the first picture and N frames of pictures, the N frames of pictures are pictures captured before the first picture is captured, and N is an integer greater than or equal to 1; and
wherein the electronic device comprises a first camera and a second camera, the first camera and the second camera are configured to capture an image of a same object, and a field angle corresponding to the first picture captured by the first camera is greater than a field angle corresponding to a second picture captured by the second camera; and
the cropping a first region in the first picture according to a first cropping parameter corresponding to the shaking parameter comprises: cropping, in a case that the electronic device displays the picture captured by the second camera, and a second cropping parameter is greater than a second preset cropping parameter, the first region in the first picture according to the first cropping parameter, wherein the second cropping parameter is a cropping parameter corresponding to the second camera determined according to the shaking parameter, and the first cropping parameter is a cropping parameter corresponding to the first camera.

10. The method according to claim 9, wherein the shaking parameter comprises at least one of the following: a rotation angle of the electronic device, a rotational angular velocity of the electronic device, a rotation direction of the electronic device, a moving speed of the electronic device, a moving acceleration of the electronic device, or a moving direction of the electronic device.

11. The method according to claim 10, wherein the cropping a first region in the first picture according to a first cropping parameter corresponding to the shaking parameter comprises:

cropping, in a case that the first cropping parameter is greater than a first preset cropping parameter, the first region in the first picture according to the first preset cropping parameter.

12. The method according to claim 9, wherein a preset cropping parameter corresponding to the first camera is different from a preset cropping parameter corresponding to the second camera.

* * * * *